US012566425B2

(12) United States Patent
Wesseloh

(10) Patent No.: US 12,566,425 B2
(45) Date of Patent: Mar. 3, 2026

(54) METHOD FOR TEMPORARILY CLOSING OPENINGS IN AIRCRAFT PARTS

(71) Applicant: Airbus Operations GmbH, Hamburg (DE)

(72) Inventor: Marc Wesseloh, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 396 days.

(21) Appl. No.: 18/177,961

(22) Filed: Mar. 3, 2023

(65) Prior Publication Data

US 2023/0315056 A1     Oct. 5, 2023

(30) Foreign Application Priority Data

Mar. 31, 2022     (EP) ..................................... 22165990

(51) Int. Cl.
| | |
|---|---|
| *G05B 19/00* | (2006.01) |
| *G05B 19/418* | (2006.01) |
| *G06K 19/077* | (2006.01) |

(52) U.S. Cl.
CPC . *G05B 19/41805* (2013.01); *G05B 19/41865* (2013.01); *G06K 19/0776* (2013.01)

(58) Field of Classification Search
None
See application file for complete search history.

(56) References Cited

U.S. PATENT DOCUMENTS

| | | |
|---|---|---|
| 8,521,448 B1 | 8/2013 | Ung et al. |
| 9,092,714 B1 | 7/2015 | Mead et al. |
| 2015/0190836 A1* | 7/2015 | Deck ...................... B05B 12/26 |
| | | 118/505 |
| 2016/0243702 A1 | 8/2016 | Crothers |
| 2021/0125022 A1 | 4/2021 | Aske et al. |
| 2021/0206512 A1 | 7/2021 | Miller |

FOREIGN PATENT DOCUMENTS

EP            3812968 A1     4/2021

OTHER PUBLICATIONS

European Search Report dated Sep. 20, 2022; priority document.

* cited by examiner

*Primary Examiner* — Paul B Yanchus, III
(74) *Attorney, Agent, or Firm* — Greer, Burns & Crain, Ltd.

(57)            ABSTRACT

A method for temporarily closing openings in an aircraft part during a manufacturing process by providing a first part that has a first opening and positioning a temporary closure member inside that first opening. The temporary closure member has an RFID tag that has stored on it a unique identification. At a later stage in the aircraft manufacturing process, a scanning device is used to scan for the RFID tag based on the identification. The temporary closure member is removed from the first opening and subsequently replaced by a permanent member.

7 Claims, 3 Drawing Sheets

31

METHOD FOR TEMPORARILY CLOSING OPENINGS IN AIRCRAFT PARTS

CROSS-REFERENCES TO RELATED APPLICATIONS

This application claims the benefit of the European patent application No. 22165990.7 filed on Mar. 31, 2022, the entire disclosures of which are incorporated herein by way of reference.

FIELD OF THE INVENTION

The invention relates to a method for temporarily closing openings during a manufacturing process.

BACKGROUND OF THE INVENTION

Currently, during aircraft manufacture and at an early stage of the production, a multitude of holes are drilled and closed with fasteners. Later during production, some of the holes have to be reopened since the position is used for additional parts, e.g., for brackets. However, it is required that holes are not left open at the beginning of the production. Removing the fasteners at a later stage requires substantial effort with regards to manufacturing and production planning.

SUMMARY OF THE INVENTION

It is an object of the invention to improve the manufacturing of aircraft.

The invention provides a method for temporarily closing openings in a part, preferably an aircraft part, during a manufacturing process, the method comprising: a) providing a first part having at least one first opening; b) positioning a temporary closure member so as to close the first opening, the closing member having an RFID tag; c) associating a unique identification with the first opening and storing the identification on the RFID tag; d) at a later stage, scanning for the RFID tag with an RFID scanning device based on the identification and removing the closure member from the first opening and installing a permanent member in the opening.

Preferably, step a) comprises providing a second part having at least one second opening and aligning at least one pair of first and second openings.

Preferably, in step b) the temporary closure member is configured as an adhesive strip and removably attached to the first part and/or second part by adhesive bonding such that the first and/or second openings are closed, wherein the RFID tag is integrated into the adhesive strip.

Preferably, in step b) the temporary closure member is configured as a temporary fastener that is getting inserted into the first and/or second openings such that the respective opening is closed and the first and second parts are removably fastened to each other by positive locking and/or friction locking.

Preferably, step c) comprises a scannable information tag that includes information indicative of an RFID frequency and/or the unique identification of the respective RFID tag into technical drawing data.

Preferably, step d) comprises scanning the information tag from the technical drawings and finding the RFID tag based on that information.

Preferably, step d) comprises the permanent member being configured as a bolt or rivet that is permanently installed in the first and/or second opening, preferably to fasten the second part to the first part.

Preferably, the first part is a primary structure part of an aircraft and the second part is a secondary structure part of an aircraft.

Preferably, the first part is a duct and the temporary closure member is a plug inserted such that the duct is closed.

One idea is to use an adhesive strip or security seal equipped with an RFID tag as a temporary closure member. The adhesive strip can mark an area for a later installation of a part (e.g., a bracket). The RFID tag functions as a digital marker and can have different applications and configurations, such as a pendant, integrated chip or the like, but all are collectively designated as an RFID tag independent of their actual embodiment.

Another possibility for a temporary closure member is a temporary fastener, such as spring deco fasteners (also sometimes referred to as "cleko fasteners"). The RFID tag may be integrated into the fastener or attached to it as a pendant.

Another possibility for a temporary closure member is a "remove before flight" tag that also has an RFID tag (either integrated or attached).

The temporary closure members, as envisaged herein, can be equipped to any kind of temporary configuration during an aircraft manufacturing process, e.g., plugs for air-conditioning ducts.

The holes/openings can be tagged for example with a spring deco sheet metal fastener. This temporary fastener can have an RFID tag that is configured as a pendant equipped with an RFID chip. The RFID tag can be detected in a later production step in order to find the temporarily fastened/closed openings. With the ideas presented here, it is possible to avoid removal of a permanent fastener.

Another idea is to integrate the RFID function directly inside the fastener. The deco fastener is an example of a fastener that can be utilized. Other types of temporary sheet metal fasteners can be used.

With the disclosure described herein, the typical and repetitive action of removing existing solid fasteners during aircraft production can be avoided. For example, a significant amount of rivets are usually installed during the primary structure assembly, but in some cases, removal of some permanent rivets is necessary, e.g., when installing secondary structure parts. However, the removal of rivets causes extra work, effort, and creates the possibility of oversized rivet installations. With the ideas presented herein, a technology is developed for avoiding extra work and effort during aircraft production.

It should be noted that in the secondary structure, open holes are usually not acceptable from the point of view of stress, e.g., related to fatigue issues. With the temporary plug installation, as disclosed herein, these issues are avoided. At an early stage of the production, usually a significant number of holes will be drilled and closed with temporary fasteners. Later in production, some of the holes must be reopened since the rivet position is used for the installation of additional parts, e.g., for brackets.

With the temporary closure members, the holes are closed from the beginning of the production. The association of RFID tags allows for a reliable and efficient removal of the temporary closure members and subsequent installation of the permanent members, e.g., rivets, bolts, plugs, etc.

The process steps can be summarized as follows: drilling of a hole in an early production step; installation of a temporary closure member with a digital marker (e.g., an RFID tag); detection of the digital marker with an electronic device, and; removal of the marker to use the holes, e.g., for installing another part.

In general, a part can be attached in any of several ways. For example, the part can be attached using a sheet metal temporary fastener with an RFID pendant or by using a sheet metal temporary fastener having an integrated RFID tag. The hole can also be closed with a security seal having an attached or integrated RFID tag.

A QR code on a technical drawing facilitates identification of the type of RFID chip frequency or (unique) identification number. The temporary closure member may have an eye-catching color to get attention (e.g., yellow or fluorescent). The temporary closure member may have an integrated optional flashlight. Preferably, the RFID tag is waterproof (e.g., IP67). The measures described herein are applicable to other temporary aircraft installations during production.

Some holes are difficult to find by a visual inspection. With the hole having an additional digital marker, it can be easier to detect. The temporary tagging of the hole can be detected with an appropriate electronic device (e.g., RFID scanner), and this reduces the effort required to find the holes that are to be opened. An RFID or other kind of electronic transmitter (collectively designated RFID tag herein) is used to mark the hole.

The electronic scanner can detect the position of the marked hole, preferably based on its unique identification and/or information from the technical drawing (e.g., QR code).

With the disclosure described herein, it is easy to install, for example, a secondary structure bracket on a primary structure rivet pattern without having to remove the solid rivet on shell level. Rather, the temporary closure member is removed and the secondary structure bracket can be installed with permanent rivets.

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

Figure 1A:
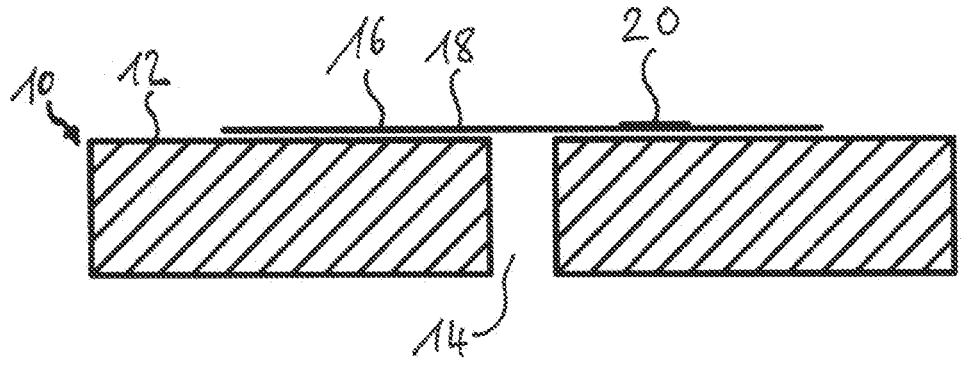
FIGS. 1A and 1B depict an embodiment of a method according to the invention.
Figure 3:
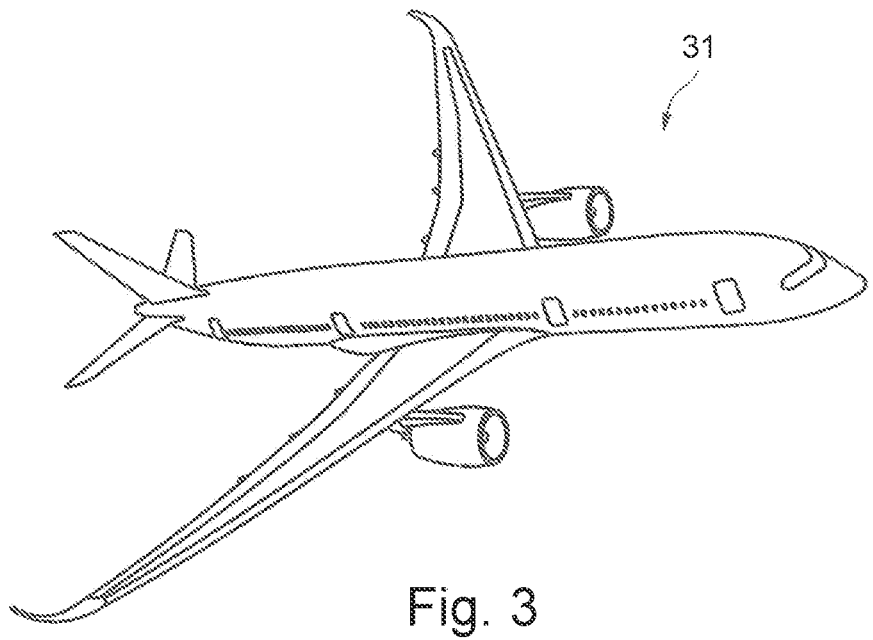
FIG. 3 depicts an aircraft.

Referring to FIG. 1A, a first part 10 is provided. The first part 10 is preferably a primary structure part 12 of an aircraft 31 (shown in FIG. 3). The first part 10 includes at least one first opening 14.

A temporary closure member 16 is attached to the first part 10. The temporary closure member 16 is an adhesive strip 18. The temporary closure member 16 is attached such that the first opening 14 is covered by the temporary closure member 16. The temporary closure member 16 preferably has an easily noticeable color, e.g., red.

The temporary closure member 16 includes an RFID tag 20. The RFID tag 20 is preferably integrated into the temporary closure member 16. The RFID tag 20 may be attached to the temporary closure member 16 as a separate element.

After the temporary closure member 16 is attached to the first part 10 and the first opening 14 is closed, a unique identification (unique ID) is associated with the location of the closed opening and stored on the RFID tag 20. In addition, the unique ID and/or the location of the temporary closure member 16 are also stored in a database and included into technical drawings for subsequent manufacturing. Alternatively (or additionally), the frequency of the RFID tag 20 can be stored. This information may be stored as scannable information, e.g., in a QR code.

At a later stage of the manufacturing process, the first opening 14 is to be permanently closed off. A worker uses an RFID scanner and scans for the temporary closure member 16 based on the information stored in the database or technical drawings. The worker finds the temporary closure member 16 and removes it. Where necessary, a solvent may be used.

Figure 1B:
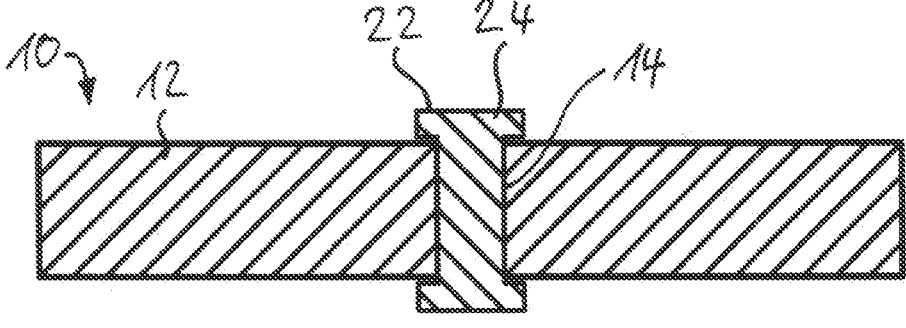

As depicted in FIG. 1B, a permanent member 22 is inserted into the first opening 14 and fixed therein. In this embodiment, the permanent member 22 is a permanent plug 24 that closes the first opening 14.

Figure 2A:
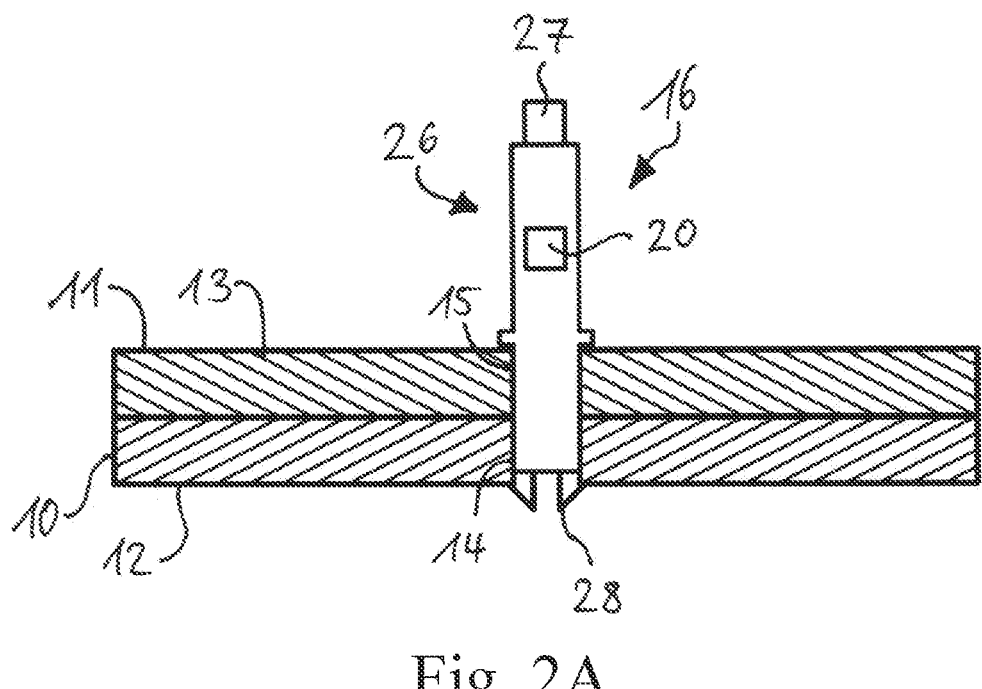
FIGS. 2A and 2B depict another embodiment of a method according to the invention.

Referring to FIG. 2A, a first part 10 and a second part 11 are provided. The first part 10 is preferably a primary structure part 12 of the aircraft 31. The first part 10 includes at least one first opening 14.

The second part 11 is preferably a secondary structure part 13 of the aircraft 31. The second part 11 includes at least one second opening 15. The second part 11 may be a mounting bracket, for example.

The first and second parts 10, 11 are arranged such that the at least one pair of first and second openings 14, 15 are aligned.

A temporary closure member 16 is inserted into the aligned pair of openings 14, 15. The temporary closure member 16 is attached such that the first and second opening 14, 15 are covered by the temporary closure member 16. The temporary closure member 16 preferably has an easily noticeable color, e.g., red.

The temporary closure member 16 is configured as a temporary fastener 26. The temporary fastener 26 comprises an actuation member 27 that actuates at least one locking member 28 between a locked and unlocked state. In the locked state, the temporary fastener 26 is prohibited from moving along the axial direction of the pair of aligned openings 14, 15. In addition, the temporary fastener 26 presses the first and second parts 10, 11 together so they are temporarily and removably fixed to each other.

The temporary closure member 16 according to this embodiment also includes an RFID tag 20. The RFID tag 20 is preferably integrated into the temporary closure member 16. The RFID tag 20 may be attached to the temporary closure member 16 as a separate element.

After the temporary closure member 16 is attached to the first and second parts 10, 11 and the first and second openings 14, 15 are closed, a unique ID is associated with the location of the closed openings and stored on the RFID tag 20. In addition, the unique ID and/or the location of the temporary closure member 16 are also stored in a database and included into technical drawings for subsequent manufacturing. Alternatively (or additionally), the frequency of the RFID tag 20 can be stored. This information may be stored as scannable information, e.g., in a QR code.

At a later stage of the manufacturing process, the first part 10 is to be permanently fixed to the second part 11. A worker uses an RFID scanner and scans for the temporary closure member 16 based on the information stored in the database or technical drawings. The worker finds the temporary closure member 16 and removes it by unlocking. Where necessary, a special tool may be used.

Figure 2B:
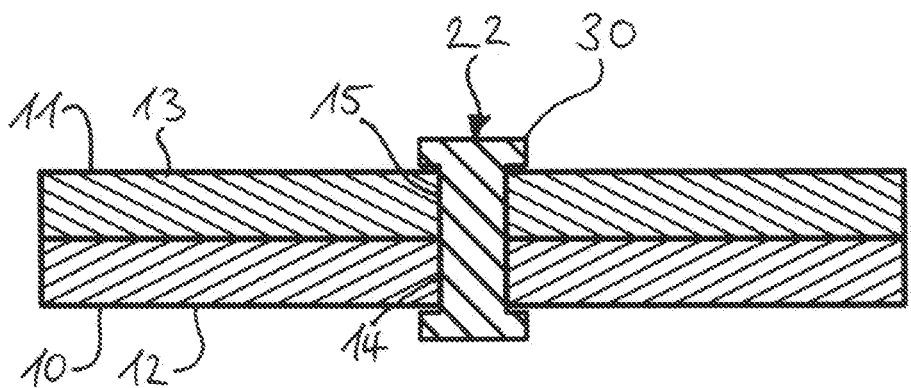

As depicted in FIG. 2B, a permanent member 22 is inserted in to the first and second openings 14, 15 and fixed therein. In this embodiment the permanent member 22 is a rivet or a bolt 30 that fixes the first and second parts 10, 11 together.

In order to improve manufacturing of an aircraft, preferably reducing the effort of reopening holes, the invention proposes a method for temporarily closing openings in an aircraft part 10, 11 during a manufacturing process by providing a first part 10 that has a first opening 14 and positioning a temporary closure member 16 inside that first opening 14. The temporary closure member 16 has an RFID tag 20 that has stored on it a unique identification. At a later stage in the aircraft manufacturing process, a scanning device is used to scan for the RFID tag 20 based on the identification. The temporary closure member 16 is removed from the first opening 14 and subsequently replaced by a permanent member 22.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 first part
11 second part
12 primary structure part
13 secondary structure part
14 first opening
15 second opening
16 temporary closure member
18 adhesive strip
20 RFID tag
22 permanent member
24 permanent plug
26 temporary fastener
27 actuation member
28 locking member
30 bolt
31 aircraft

The invention claimed is:

1. A method for temporarily closing openings in an aircraft part during a manufacturing process, the method comprising:
   a) providing a first part having at least one first opening;
   b) positioning a temporary closure member so as to close the first opening, the temporary closure member having an RFID tag;
   c) associating a unique identification with the first opening and storing the identification on the RFID tag and including a scannable information tag that includes information indicative of an RFID frequency, or the unique identification of the respective RFID tag, or both into technical drawing data;
   d) at a later stage, scanning the information tag from the technical drawing data and finding the RFID tag based on that information, scanning for the RFID tag with an RFID scanning device based on the identification and removing the temporary closure member from the first opening and installing a permanent member in the first opening.

2. The method according to claim 1, wherein step a) comprises providing a second part having at least one second opening and aligning at least one pair of first and second openings wherein the temporary closure member is positioned so as to close the first opening or the second opening or both.

3. The method according to claim 1, wherein in step b) the temporary closure member is configured as an adhesive strip and removably attached to the first part or a second part, or both first and second parts, by adhesive bonding such that the first opening or second opening, or both openings, are closed, wherein the RFID tag is integrated into the adhesive strip.

4. The method according to claim 1, wherein in step b) the temporary closure member is configured as a temporary fastener that is inserted into the first opening or a second opening or both first and second openings, such that the respective opening is closed and the first part and a second part are removably fastened to each other by positive locking or friction locking or both positive and friction locking.

5. The method according to claim 1, wherein step d) comprises the permanent member being configured as a bolt or rivet or plug that gets permanently installed in the first opening of the first or a second opening of a second part, or both the first opening and the second opening, to fasten the second part to the first part.

6. The method according to claim 1, wherein the first part is a primary structure part of a aircraft and a second part is a secondary structure part of the aircraft.

7. The method according to claim 1, wherein the first part is a duct, and the temporary closure member is a plug that gets inserted such that the duct is temporarily closed.

* * * * *